United States Patent [19]

Kimmel

[11] Patent Number: 5,670,046

[45] Date of Patent: *Sep. 23, 1997

[54] TREATMENT OF NUTRIENT-RICH WATER

[75] Inventor: Ronald C. Kimmel, Belle Glade, Fla.

[73] Assignee: RJJB & G, Inc., West Palm Beach, Fla.

[*] Notice: The term of this patent shall not extend beyond the expiration date of Pat. No. 5,462,666.

[21] Appl. No.: 550,490

[22] Filed: Oct. 30, 1995

Related U.S. Application Data

[63] Continuation-in-part of Ser. No. 314,605, Sep. 28, 1994, Pat. No. 5,462,666.

[51] Int. Cl.$^6$ .................... C02F 3/06; C02F 3/30; C02F 3/10; C02F 3/32

[52] U.S. Cl. .................. 210/602; 210/605; 210/614; 210/615; 210/617; 210/630; 210/631; 210/721; 210/724; 210/747; 210/151; 210/170; 210/205; 210/218; 210/248; 210/283; 210/284; 210/903; 210/906; 210/748; 435/292.1; 435/299.1; 47/1.4

[58] Field of Search .................. 210/602, 605, 210/614, 615, 616, 617, 630, 631, 709, 718, 721, 724, 743, 747, 748, 96.1, 101, 150, 151, 170, 199, 205, 218, 248, 266, 283, 284, 903, 906; 47/1.4; 435/292.1, 299.1

[56] References Cited

U.S. PATENT DOCUMENTS

| | | | |
|---|---|---|---|
| 681,884 | 9/1901 | Monjeau | 210/602 |
| 3,649,532 | 3/1972 | McLean | 210/151 |
| 3,956,128 | 5/1976 | Turner | 210/150 |
| 3,957,632 | 5/1976 | Knopp et al. | 210/616 |
| 3,980,556 | 9/1976 | Besik | 210/616 |
| 4,008,159 | 2/1977 | Besik | 210/617 |
| 4,126,544 | 11/1978 | Baensch et al. | 210/615 |
| 4,500,429 | 2/1985 | Reimann et al. | 210/616 |
| 4,664,803 | 5/1987 | Fuchs et al. | 210/603 |
| 4,689,301 | 8/1987 | Adet et al. | 47/1.4 |
| 4,698,163 | 10/1987 | Zibrida | 210/724 |
| 4,780,207 | 10/1988 | Engwirda | 210/603 |
| 4,826,601 | 5/1989 | Spratt et al. | 210/631 |
| 4,895,645 | 1/1990 | Zorich, Jr. | 210/605 |
| 4,919,815 | 4/1990 | Copa et al. | 210/603 |
| 4,931,183 | 6/1990 | Klein et al. | 210/614 |
| 4,952,511 | 8/1990 | Radmer | 435/292.1 |
| 4,970,166 | 11/1990 | Mori | 435/292.1 |
| 4,992,207 | 2/1991 | Darnall et al. | 210/616 |
| 5,106,504 | 4/1992 | Murray | 210/602 |
| 5,137,625 | 8/1992 | Wolverton | 210/195.1 |
| 5,151,347 | 9/1992 | Delente et al. | 47/1.4 |
| 5,156,741 | 10/1992 | Morrison et al. | 210/602 |
| 5,174,897 | 12/1992 | Wengrzynek | 210/602 |
| 5,192,442 | 3/1993 | Piccirillo et al. | 210/605 |
| 5,298,164 | 3/1994 | Hapach et al. | 210/615 |
| 5,344,562 | 9/1994 | Lorenz et al. | 210/906 |
| 5,372,720 | 12/1994 | Jönsson | 210/614 |
| 5,393,427 | 2/1995 | Barnard | 210/906 |
| 5,397,755 | 3/1995 | Parker et al. | 210/615 |
| 5,407,576 | 4/1995 | Wolf et al. | 210/602 |
| 5,447,629 | 9/1995 | Chaumont et al. | 210/150 |

*Primary Examiner*—Peter A. Hruskoci
*Assistant Examiner*—Theodore M. Green
*Attorney, Agent, or Firm*—Quarles & Brady

[57] ABSTRACT

A multistage treatment system for treating nutrient-rich water containing nitrogen compounds, phosphorous compounds, and other minerals. Three or more vessels or stages typically constitute the multistage treatment system. Each stage of the system is a reaction vessel having a first zone containing a substantially insoluble salt for precipitating phosphorous compounds and other minerals, a second zone containing a microorganism retained on an inert substrate for converting nitrogen compounds, and a separation device for removing precipitates from the water. The effluent from the multistage system may be further treated in ponds cultivated with aquatic grass or in a packaged algae filter having a medium for supporting algae growth and an artificial light source.

33 Claims, 3 Drawing Sheets

TREATMENT OF NUTRIENT-RICH WATER

This application is a continuation-in-part of U.S. Ser. No. 08/314,605 filed Sep. 28, 1994, now U.S. Pat. No. 5,462,666.

BACKGROUND OF THE INVENTION

1. Technical Field

This invention relates generally to the treatment of nutrient-rich water. More particularly, it relates to a physical-chemical and microbiological process and apparatus to remove nitrogen compounds and phosphorous compounds from bodies of water.

2. Background Art

Water typically contains a variety of contaminants. For example, run-off from agricultural land contains manure, fertilizers, and pesticides. Effluent from municipal secondary treatment sewage plants contains nitrogen and phosphorous compounds. Moreover, phosphorous and nitrogen compounds build up over time in aquaculture and aquarium waters. The above examples of contaminated water all have in common relatively high nutrient levels containing phosphorous compounds, nitrogen compounds, and other minerals. These type of waters are receiving a greater scrutiny for their deleterious effects on the environment.

A number of methods are known for dealing with organic and inorganic contaminants in wastewater. For example, U.S. Pat. No. 3,957,632; U.S. Pat. No. 3,980,556; U.S. Pat. No. 4,500,429; U.S. Pat. No. 4,664,803; U.S. Pat. No. 4,780,207; U.S. Pat. No. 4,919,815; and U.S. Pat. No. 4,931,183 disclose the use of biological treatment to remove carbonaceous and nitrogen compounds from wastewater. The disclosure of the above patents, and of all other articles and patents recited herein, are incorporated by reference as if fully set forth herein.

Other processes use vegetation and soil to remove wastewater contaminants, sometimes in conjunction with biological treatment. See, for example, U.S. Pat. No. 681,884; U.S. Pat. No. 5,137,625; and U.S. Pat. No. 5,156,741. Finally, U.S. Pat. No. 5,106,504 discloses an artificial water impoundment system planted in aquatic vegetation to remove pollutants from run-off water. However, much remains to be done in economically and compactly treating waters which are high in nutrient content.

As a result, a need exists for a low cost treatment system for handling water having a high nutrient content. Such a system would be useful for treating agricultural run-off, aquaculture and aquarium systems, swamp and canal water contamination, and effluent from municipal secondary sewage treatment plants.

DISCLOSURE OF THE INVENTION

One version of the invention provides a method of treating nutrient-rich water containing nitrogen compounds, phosphorous compounds, and other minerals comprising the following steps in order: feeding the nutrient-rich water to at least one first reaction vessel having a first zone containing a substantially insoluble basic salt and a second zone containing aerobic microorganisms retained on an inert substrate; controlling the rate of flow of the water to carry out in the first reaction vessel the reactions of: maintaining the pH of the water in the first zone for precipitating at least a portion of the phosphorous compounds and other minerals, and biologically oxidizing in the second zone under aerobic conditions at least a portion of the nitrogen compounds to nitrites and nitrates; separating the precipitated phosphorous and minerals from the water; feeding the separated water from the first vessel to at least one second reaction vessel having a first zone containing a substantially insoluble basic salt and a second zone containing anaerobic microorganisms retained on an inert substrate; controlling the rate of flow of the water to carry out in the second reaction vessel the reactions of: maintaining the pH of the water in the first zone for precipitating at least a portion of the phosphorous compounds and other minerals, and biologically reducing in the second zone under anaerobic conditions at least a portion of the nitrites and nitrates to nitrogenous gas; separating the precipitated phosphorous and minerals from the water; feeding the separated water from the second vessel to at least one third reaction vessel having a first zone containing a substantially insoluble basic salt and a second zone containing aerobic microorganisms retained on an inert substrate; aerating the third reaction vessel; controlling the rate of flow of the water to carry out in the third reaction vessel the reactions of: elevating the pH of the water in the first zone and thereby precipitating at least a portion of the phosphorous compounds and other minerals, and biologically oxidizing in the second zone at least a portion of unoxidized nitrogen compounds to nitrates; separating the precipitated phosphorous and minerals from the water; and removing the separated water from the third reaction vessel at a rate to achieve steady state.

Preferably, the substantially insoluble basic salt is dolomite and the inert substrate is lava rock. The method may also include the further step of feeding the separated water removed from the third vessel reaction to at least one pond having an inlet, an outlet, and a plurality of ridges disposed on the bottom of the pond. Preferably, the at least one pond is progressively shallower from the inlet to the outlet and is cultivated with aquatic grass. The aquatic grass is preferably cabomba grass. The first reaction vessel, the second reaction vessel, and the third reaction vessel may be a plurality of serial zoned vessels.

Another version of the invention provides an apparatus for treating nutrient-rich water containing nitrogen compounds, phosphorous compounds, and other minerals comprising: at least one first reaction vessel having a first zone containing a substantially insoluble basic salt and a second zone containing aerobic microorganisms retained on an inert substrate, the first vessel having an inlet for feeding the nutrient-rich water to the first zone, and with the first zone and the second zone disposed adjacent to each other and separated by a perforated support sized to retain the insoluble salt while allowing the nutrient-rich water to pass therethrough; a first separation device disposed for receiving water from the second zone of the first vessel and for separating precipitates therefrom; transfer means for removing water from the first separation device; at least one second reaction vessel having an inlet for accepting water from the transfer means, the second reaction vessel having a first zone containing a substantially insoluble basic salt and a second zone containing anaerobic microorganisms retained on an inert substrate, the first zone being in fluid communication with the inlet, and with the first zone and the second zone disposed adjacent to each other and separated by a perforated support sized to retain the insoluble salt while allowing the water to pass therethrough; a second separation device disposed for receiving water from the second zone of the second vessel and for separating precipitates therefrom; transfer means for removing water from the second separation device; at least one third reaction vessel having an inlet for accepting water from the transfer means, the third reaction vessel having a first zone containing a substantially insoluble basic salt and a second zone containing aerobic microorganisms retained on an inert substrate, the first zone being in fluid communication with the inlet, and with the first zone and second zone disposed adjacent to each other and separated by a perforated support sized to retain the insoluble salt while allowing the water to pass therethrough; a third separation device disposed for receiving water from the second zone of the third vessel and for separating precipitates therefrom; transfer means for removing water from the third separation device; and an aeration device for injecting air into the second zone of the third vessel and a vent disposed at the first zone of the third vessel to remove gas.

The substantially insoluble basic salt is preferably dolomite and the inert substrate is lava rock. The transfer means of the third reaction vessel is preferably a ridged spillway. The apparatus may include at least one pond in fluid communication with the ridged spillway having an inlet, an outlet, and a plurality of ridges disposed on the bottom of the pond. Preferably, the at least one pond is progressively shallower from the inlet to the outlet. The at least one pond may be cultivated with aquatic grass. The aquatic grass is preferably cabomba grass. The apparatus may include each of the first reaction vessel, the second reaction vessel, and the third reaction vessel being a plurality of serial zoned vessels.

Another aspect of the present invention provides an algae filter for treating water comprising a vessel having an inlet and an outlet; a medium disposed in the vessel whereby the medium is capable of supporting algae growth; and an artificial light source mounted at the vessel to thereby direct light onto the medium supporting algae growth. "Mounted at the vessel" means either external or internal to the vessel. Preferably, the artificial light source contains UV light. Another aspect of the algae filter provides a plenum disposed in the vessel, the plenum having at least one transparent wall, wherein the medium for supporting algae growth is external to the plenum and the artificial light source is mounted in the plenum. Preferably, the at least one transparent wall of the plenum comprises a thermoplastic poly (methyl methacrylate)-type polymer ("Plexiglas"). The medium disposed in the algae filter preferably comprises one or a plurality of perforated trays. The perforated tray is preferably transparent; most preferably it is "Plexiglas". The inlet of the algae filter advantageously has a nozzle for distributing water over the medium. The medium can also comprise a fixed or fluid bed of packing material or particles, respectively. The packing material is preferably transparent.

The objects of the invention, therefore, include providing a method and apparatus of treating water having a high nutrient content which:

(a) results in the efficient removal of nitrogen and phosphorous compounds in the water;

(b) provides cost effective installation and operation;

(c) provides a mineral and sludge waste which has soil conditioning and fertilizer value;

(d) provides a mineral and sludge waste which can be safely land disposed;

(e) provides for the removal of residual trace contaminants by cultivating grasses which can be then harvested and used as a fertilizer base; and (f) provides a nutrient-rich water treatment system which is capable of effectively removing nutrients in either fresh or salt water regimes.

These and still other objects and advantages of the present invention will be apparent from the description below.

However, this description is only of the preferred embodiments. The claims should, therefore, be looked to in order to assess the whole scope of the invention.

BEST MODES FOR CARRYING OUT THE INVENTION

Figure 1:
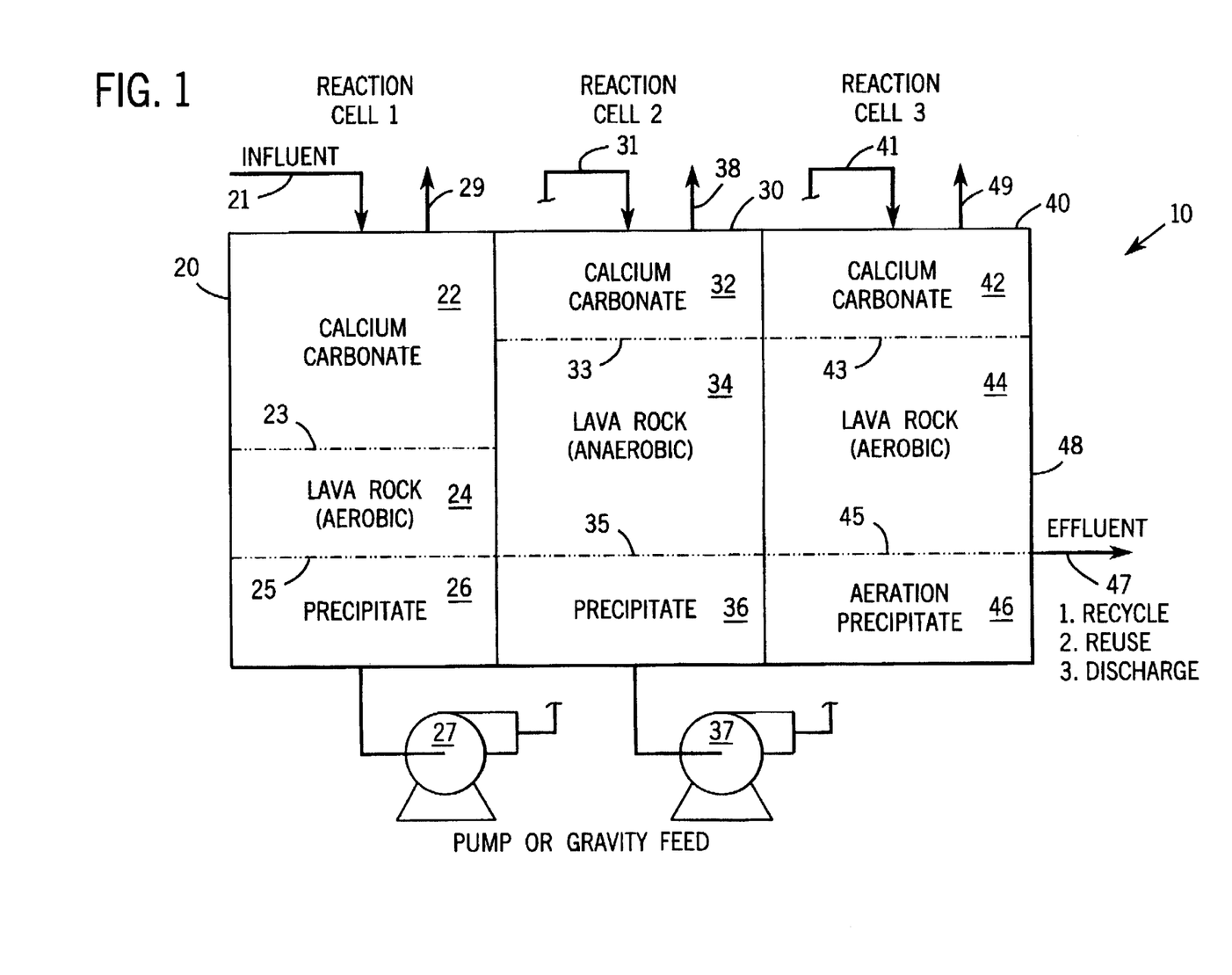
FIG. 1 is a schematic of the apparatus and method of one embodiment of the present invention.

Turning now to FIG. 1, 10 represents the multistage treatment system of the present invention. Three or more vessels or stages typically constitute the multistage treatment system 10. The source of the nutrient-rich water may include secondary or tertiary effluent from municipal waste treatment plants, agricultural runoff, aquarium or aquaculture systems, canals, and other bodies of water (e.g., the Everglades).

Nutrient-rich water enters via line 21 to the first reaction vessel 20. Feed containment system 15 (e.g. a pond or a vessel) stores nutrient-rich water for introduction into the multistage treatment system 10. Pumping station 17 feeds the water to line 21. The first reaction vessel 20 may include sufficient free-board above first zone 22 so that the nutrient-rich water can be fed by gravity through the remainder of the multistage treatment system 10.

Reaction vessel 20 has a first zone 22 of a substantially insoluble basic salt supported by a perforated support 23 sized to retain the salt but allowing the water to pass through. The first reaction vessel 20 also contains a second zone 24 having an inert substrate which retains an aerobic microorganism. The inert substrate is supported by perforated support 25 which retains the inert substrate while allowing the water to pass therethrough.

The basic salt of first zone 22 has a particle size which allows sufficient inter-particle voids to allow the water to pass therethrough while providing adequate surface area to contact the water. The design is preferably that of a packed trickle bed filter. By "substantially insoluble" we mean the basic salt is sufficiently insoluble in water so that it retains its packed bed character while in operation. By "basic salt" we mean a salt in the sense of a Brensted base which is capable of acquiring protons from another substance. Preferably, the basic salt is a magnesium carbonate or calcium carbonate salt. Most preferably, the basic salt is dolomite. By dolomite we mean a limestone ($CaCO_3$) typically comprising at least 5% $MgCO_3$. The basic salt should be capable of maintaining the pH of the water above 6.8, preferably above 7.2, and most preferably 8.5–9. The basic salt preferably is a mixture of particles ranging from 0.5 inches to 4 inches in diameter.

The inert substrate of the second zone 24 also preferably has the characteristics of a packed trickle bed filter. The inert substrate is preferably a solid such as activated carbon, various forms of clay, flyash and the like. The most preferred inert substrate is crushed lava rock. The inert substrate preferably has a large surface area to volume ratio to provide good water contact and support for bacterial growth. The inert substrate preferably is a mixture of particles ranging from 0.5 inches to 4 inches in diameter.

The aerobic bacteria may be that of nitrosomonas or nitrobacterium. The second zone 24 may be biologically seeded with a mixture of manure and water. The volumetric ratio of first zone 22 to second zone 24 depends on the water chemistry and the application, but may be typically 60:40 to 50:50. The reaction vessel 20 preferably has vent 29 for eliminating any ammonia formed by the pH elevation. Each of the reaction vessels 20, 30, and 40 may be constructed of steel sheet stock which is epoxy-coated and preferably portable. For larger permanent installations the reaction vessels are preferably constructed of concrete.

The bottom zone 26 acts as a device to allow precipitated minerals to settle out from the water. This zone may be a slanted hopper which allows the precipitate to settle to a coned-shape bottom where the solids can be removed. Pump 27 removes the clarified water and injects it via line 31 to the second reaction vessel 30 (or the water can be simply gravity fed). The precipitation device of zone 26 may also be any conventional solid/liquid separation device such as a centrifuge or rotary vacuum filter.

The second reaction vessel 30 mirrors the layout of the first with zones 32, 34, and 36 (corresponding to zones 22, 24, 26, respectively) except that the inert substrate of the second zone 34 retains an anaerobic microorganism. Elements 33 and 35 are likewise a perforated support member.

The anaerobic microorganism of second zone 34 is preferably a facultative organism capable of utilizing oxygen in nitrates. The second zone 34 may likewise be seeded with a mixture of manure and water. The second reaction cell 30 is constructed to eliminate any contact with air and light and is equipped with a vent 38 to eliminate nitrogen formed by the microbiological activity. The volumetric ratio of first zone 32 to second zone 34 depends on the water chemistry and the application, but may be typically 10:90.

Pump 37 conveys separated water from reaction vessel 30 via line 41 to reaction vessel 40 (or the water can be simply gravity fed). Reaction vessel 40 has zones 42, 44, and 46 corresponding to the zones of reaction vessels 20 (zones 22, 24, 26) and 30 (zones 32, 34, 36). However, reaction vessel 40 is positively aerated through line 48 into the second zone 44. A vent line 49 provides exhaust for the air and any nitrogen formed. Elements 43 and 45 are likewise a perforated support member.

The second zone 44 contains an aerobic microorganism retained on the inert substrate for converting residual nitrates to nitrogen. The volumetric ratio of first zone 42 to second zone 44 depends on the water chemistry and the application, but may be typically 10:90.

Figure 2:
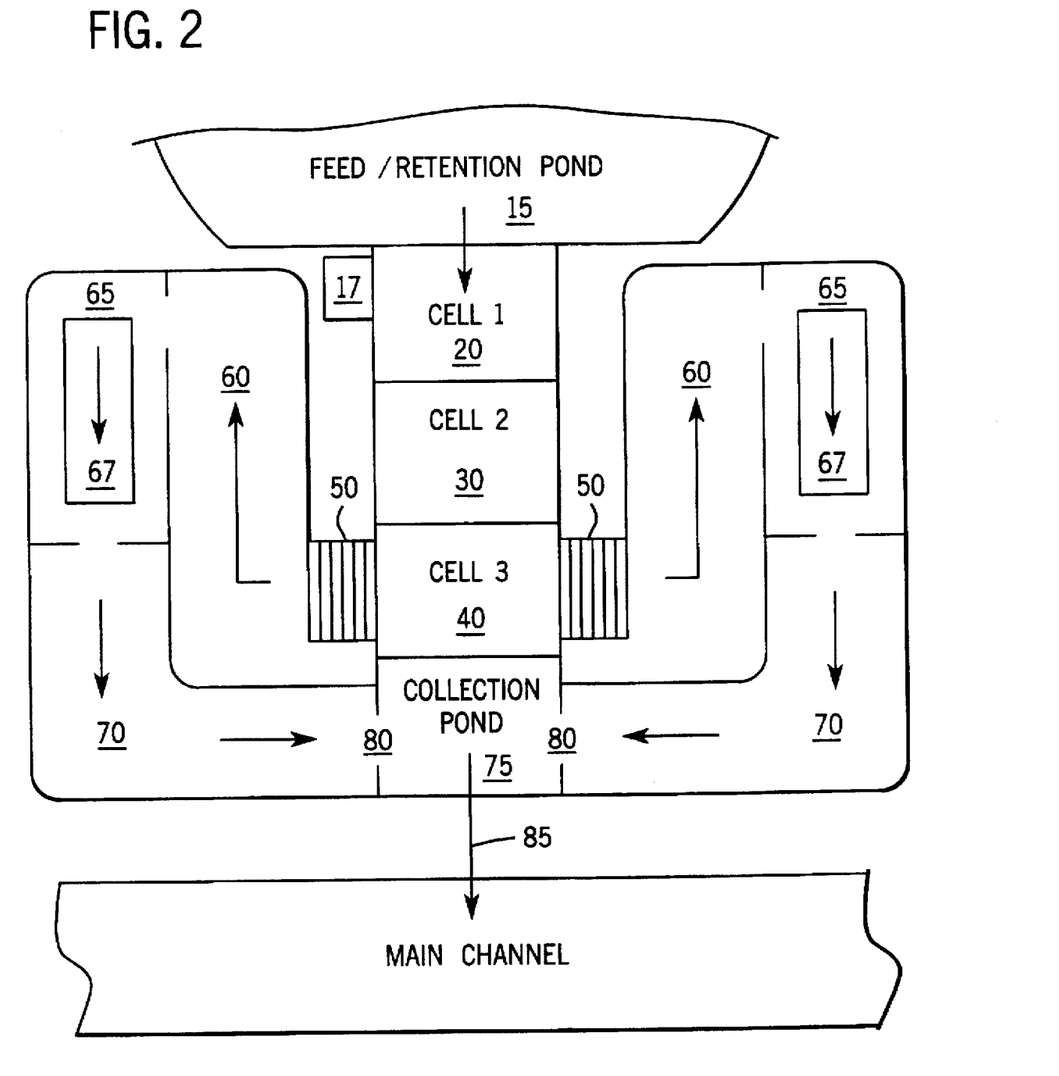
FIG. 2 is a plan view of the apparatus of another embodiment of the present invention.

Turning now to FIG. 2, the effluent 47 from reaction vessel 40 travels over at least one spillway 50 to at least one pond 60. Pond 60 is ridged with progressively shallower depths toward the outlet to second pond 65. Second pond 65 preferably has a depressed settling area 67 which is deeper than the rest of pond 65. This settling area serves as a further means to remove sludge and precipitate. The outlet from pond 65 then enters third pond 70. Pond 70 is also ridged with progressively shallower depths to the outlet 80. Outlet 80 may feed to a final containment system 75 (e.g., a pond). Discharge 85 from final containment system 75 may then be directed to feed pond 15 as recycle, to agricultural irrigation, to the environment (e.g., a canal system), or to reaction vessel 20 as recycle.

Spillway 50 is preferably stepped or ridged and is capable of removing trace elements through fluid movement akin to a gold prospector's pan. The ponds 60, 65, and 70 preferably have a dolomite bottom. Preferably, the ponds can be planted with aquatic grass which serve to remove any trace contaminants. Most preferably, the aquatic grass is cabomba grass.

The system is best characterized as a combination of a physical/chemical process and a microbiological process. The primary goal is nutrient reduction by effectively reducing phosphorous, ammonia, nitrite, and nitrate levels to acceptable limits for discharge.

The system is constructed to provide three or more processing vessels. For example, each reaction vessel may be a plurality of serial vessels each containing the aforementioned basic salt and inert substrate zones. Each vessel is designed to further the reduction of phosphorous and nitrogen levels in the water stream. The system principally uses inorganic precipitation reactions for the removal of phosphorous. Nitrogen is removed in the system by the nitrification/denitrification microbiological means discussed above.

The first reaction vessel is constructed with a first zone of calcium carbonate or dolomite. This layer causes the typically acidic water stream to reach saturation pH levels which begins the process of mineral and phosphorous precipitation. The elevated pH causes a reduction in phosphorous levels, as this element is precipitated along with other mineral salts.

Also, pH levels above 6.8 begin to drive ammonium ions to the ammonia form. Accordingly, some ammonia outgassing will occur at this point and the first reaction vessel should be vented. The second zone of the first reaction vessel is made up of an inert substrate, which is ideal media for support of aerobic nitrification. Given the elevated pH and ample microbiological contact time, the nitrification of ammonia to nitrites and nitrates is accelerated in this step of the process. The final zone of the first reaction vessel is a collection sump for precipitated minerals, sludge, and primary treated wastewater. The precipitated minerals and sludge are removed for disposal. The precipitated minerals and sludge are typically suitable for soil conditioning or fertilizing. Primary treated wastewater can be pumped or gravity fed to the second reaction vessel for further processing.

The second reaction vessel also utilizes a first zone of calcium carbonate or dolomite. This material performs the same function as in the first reaction vessel by elevating pH and precipitating phosphorous compounds and minerals. The second zone of the second reaction vessel is made up of an inert substrate and is oxygen deprived to promote anaerobic conditions. The second zone supports the anaerobic reduction of nitrite and nitrate levels in the water stream. Outgassing of nitrogen occurs so the reaction vessel should be vented. The last zone of the second reaction vessel is a collection sump for precipitated minerals, sludge and secondary treated water. The precipitated minerals and sludge are removed for disposal. The precipitated minerals and sludge are typically suitable for soil conditioning or fertilizing. Secondary treated wastewater can be pumped or gravity fed to the third reaction vessel for final processing.

The third reaction vessel in the system also utilizes a first zone of calcium carbonate or dolomite and performs the same function as in the previous two reaction vessels namely, pH elevation and precipitation. The second zone of the third reaction vessel is again made up of inert substrate, but is oxygen enriched through forced aeration for optimum aerobic conditions. The second zone reduces any remaining ammonia or nitrite contaminants to the more benign nitrate form. A vent is provided to eliminate the aeration gas and the nitrogen generated by the microbial action. The precipitated minerals and sludge are removed for disposal. The precipitated minerals and sludge are typically suitable for soil conditioning or fertilizing. Tertiary effluent from the final aerobic reduction process is discharged to a series of ponds as explained above. The ponds are planted in grass that can absorb any remaining nitrogen and phosphorous compounds and/or trace metals. The grass can be harvested for use as fertilizers. The grass is preferably cabomba grass.

Example 1

A multistage treatment system having three reaction vessels, as described above, was installed for reducing nutrient levels in a 135 gallon salt water aquarium. The total cumulative volume of dolomite in the three vessels was 1.5 ft$^3$. The total cumulative volume of lava rock in the three vessels was 4.5 ft$^3$. The feed rate of water (influent) to the multistage system was 340 gal/hr. (5.66 gal/min.). A fourth vessel contained algae which removed residual-contaminants.

The multistage system reached steady state after day 28. Water analysis for the influent and effluent streams, from start-up to steady state and beyond, is as follows:

| Day | Analysis | Influent | Effluent |
|---|---|---|---|
| 1 | pH | 7.0 | 8.6 |
|  | NH$_3$ | 0.0 | 0.0 |
| 7 | pH | 7.0 | 8.2 |
|  | NH$_3$ | 6–8 ppm | 6–8 ppm |
|  | NO$_2$ | 1 ppm | 1 ppm |
| 12 | pH | 7.0 | 8.2 |
|  | NH$_3$ | >10 ppm | 8 ppm |
|  | NO$_2$ | 2.0 ppm | >4 ppm |
|  | NO$_3$ | 0.0 | 0.0 |
| 15 | pH | 6.8 | 8.4 |
|  | NH$_3$ | >10 ppm | 0.5 ppm |
|  | NO$_2$ | >4 ppm | 2.0 ppm |
|  | NO$_3$ | 0.5 ppm | 0.05 ppm |
| 20 | pH | 7.0 | 8.4 |
|  | NH$_3$ | >10 ppm | 0.5 ppm |
|  | NO$_2$ | 2.0 ppm | 0.2 ppm |
|  | NO$_3$ | 0.5 ppm | 0.5 ppm |
| 28+ | pH | 7.0 | 8.0–8.5 |
| (SteadyState) | NH$_3$ | >10 ppm | 0.0 ppm |
|  | NO$_2$ | 2.0 ppm | 0.0 ppm |
|  | NO$_3$ | 0.5 ppm | 0.05 ppm |
|  | PO$_4$ | >10 ppm | 0.0 ppm |

To treat one million gallons per day of nutrient-rich water, it is estimated that the volumes of dolomite and lava rock in each reaction vessel would be as follows:

| Vessel | 1 | 2 | 3 | Total |
|---|---|---|---|---|
| Total (ft$^3$) | 300 | 300 | 300 | 900 |
| Dolomite (ft$^3$) | 150 | 50 | 50 | 250 |
| Lava Rock (ft$^3$) | 150 | 250 | 250 | 650 |

It should be understood that the multistage treatment system of the present invention can successfully remove nutrients in either fresh water or salt water environments. One skilled in the art will understand that microorganisms would be used which are compatible with the particular water chemistry. Likewise, appropriate materials of construction would be chosen for a salt water environment.

It should also be understood that precipitated phosphorous and minerals do not necessarily need to be removed at each separate reaction vessel. For example, if the amount of precipitates in the water is low, then one could settle and remove the precipitates in a pond or vessel positioned after the multistage treatment system. Alternatively, one could remove precipitates at any one or all of the reaction vessels depending on the precipitate load.

It should be further understood that the insoluble basic salt zone and the zone of microorganism retained on an inert substrate may be in separate reaction vessels. Thus, the preferred multistage system having three 2-zone reaction vessels could, in fact, have six reaction vessels in series with each vessel alternating between having a load of salt and microorganism. Accordingly, the claims should be looked to in order to assess the whole scope of the invention.

Algae Filter

Figure 3:
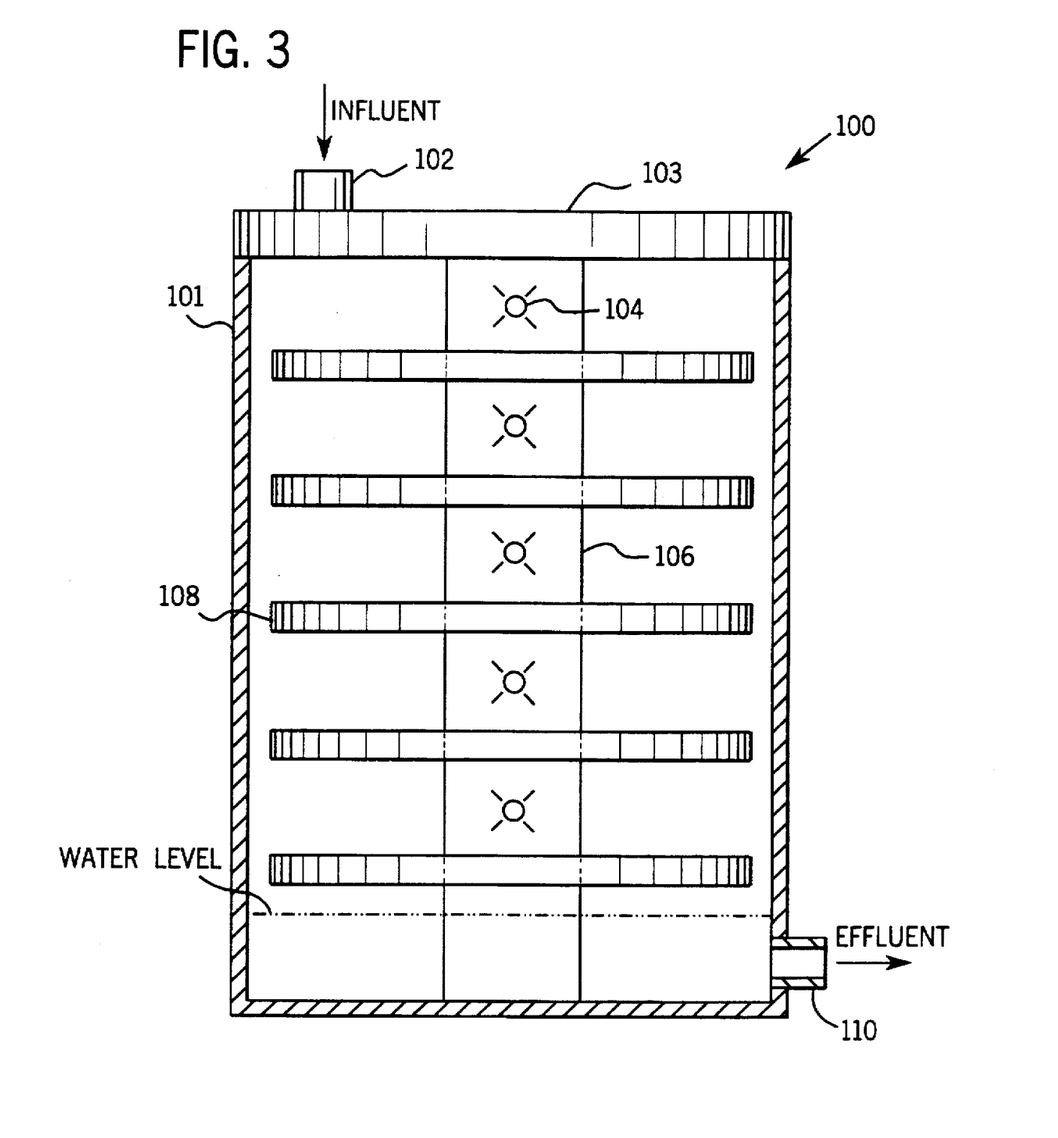
FIG. 3 is a schematic of an algae filter.

Referring now to FIG. 3, an algae filter 100 is shown. The algae filter is useful in reducing nitrates and other contaminants from a variety of sources.

One application is used in situations where algae culture in ponds is not practical for use with the above-described multistage filter system. For example, the algae filter is particularly advantageous when used with the above-described multistage filter system in treating fresh or salt water aquariums.

Water from the previously described multistage filter system enters an algae filter 100 at inlet 102. The algae filter is fitted with stacked, spaced apart perforated trays 108. The perforated trays 108 are capable of supporting the growth of algae. Preferably, the trays are made of a clear thermoplastic poly (methyl methacrylate)-type polymer ("Plexiglas") with perforations up to ¼ inch diameter. A plenum 106 is provided in the algae filter. The plenum has at least one transparent walls preferably made of "Plexiglas". The plenum 106 is sealed against the liquid environment and houses an artificial light source 104 which provides proper light conditions for the growth of algae on the perforated trays 108. The artificial light source 104 may be, for example, fluorescent lights or UV lights.

Preferably, the algae filter tank 101 is constructed of a plastic such as polyethylene (if the artificial light source is mounted outside the vessel, the tank would preferably be constructed of clear "Plexiglas"). Preferably, the tank lid 103 is fixedly attached to the plenum 106 for easy removal of the artificial light source. The plenum 106 is sealed at the bottom.

Preferably, the inlet 102 is fitted with a nozzle which distributes incoming water over the uppermost perforated tray. The water leaves the algae filter 100 via outlet 110.

Alternatively, the medium for supporting algae growth can be a packed or fixed bed in lieu of the stacked perforated trays 108. For example, the packed bed can be comprised of transparent cylinders or spheres. The cylinders would preferably be made of "Plexiglas" and be about 1 inch long and about 1½ inches in diameter. The spheres would preferably be made out of "Plexiglas" as well and be sized at about ½ inch diameter.

Another alternative is using a fluidized bed for the medium rather than the perforated trays. In this case, a source of air or physical agitation can be used to keep the medium fluidized.

The algae culture in the algae filter utilizes available nitrate in the water as a nutrient for growth, food production and respiration. The algae biomass assimilates the nitrate, which is ultimately disposed of during periodic cleanings of the algae filter.

Example 2

Two salt water aquariums were started with 8.4 pH and no bacteria added. The aquariums were installed with a continuous treatment loop, zero discharge, with the multistage filter system of Example 1 upstream of a packaged algae filter (as described above and as shown in FIG. 3) used as a final nitrate/nitrite polisher.

Fish, crustaceans and anemones were added 3 days after the aquariums were prepared. Approximately 10 days following the addition of marine life, no measurable levels of ammonia, nitrate or nitrite existed in either of the two aquariums.

At this time, 8 ounces of household ammonia was added to the aquariums. Measurements of ammonia and nitrite were taken 24 hours later and both species were elevated to toxic levels.

Brown algae was present in both aquariums for four weeks following the addition of the ammonia. Over this time frame, the biomass in the multistage filter system and the packaged algae filter developed. After this four-week period, the brown algae in the aquariums began to disappear. Within 7 days (5 weeks after the ammonia addition), all brown algae was gone from both aquariums. Small amounts of both brown and green algae were discovered in the packaged algae filter. The aquariums have now operated as a closed loop system, algae-free for several months.

This process progression indicates that once a filter biomass is established, the multistage filter system, in conjunction with the packaged algae filter, can maintain a nutrient-free recycled make-up to the aquariums.

The packaged algae filter can be easily cleaned on a scheduled basis. During this cleaning process, most of the algae crop is harvested, and algae adsorbed nutrients are removed with the crop. This provides for a naturally safe method of nitrate and nitrite nutrient reduction.

I claim:

1. A method of treating nutrient-rich water containing nitrogen compounds, phosphorous compounds, and other minerals comprising the following steps:
   (a) feeding the nutrient-rich water to at least one first reaction vessel having a first zone containing a substantially insoluble basic salt and a second zone containing aerobic microorganisms retained on an inert substrate;
   (b) controlling the rate of flow of the water to carry out in the first reaction vessel the reactions of:
      (1) maintaining the pH of the water in the first zone for precipitating at least a portion of the phosphorous compounds and other minerals, and
      (2) biologically oxidizing in the second zone under aerobic conditions at least a portion of the nitrogen compounds to nitrites and nitrates;
   (c) feeding the water from the first vessel to at least one second reaction vessel having a first zone containing a substantially insoluble basic salt and a second zone containing anaerobic microorganisms retained on an inert substrate;
   (d) controlling the rate of flow of the water to carry out in the second reaction vessel the reactions of:
      (1) maintaining the pH of the water in the first zone for precipitating at least a portion of the phosphorous compounds and other minerals, and
      (2) biologically reducing in the second zone under anaerobic conditions at least a portion of the nitrites and nitrates to nitrogenous gas;
   (e) feeding the water from the second vessel to at least one third reaction vessel having a first zone containing a substantially insoluble basic salt and a second zone containing aerobic microorganisms retained on an inert substrate;
   (f) aerating the third reaction vessel;
   (g) controlling the rate of flow of the water to carry out in the third reaction vessel the reactions of:
      (1) maintaining the pH of the water in the first zone for precipitating at least a portion of the phosphorous compounds and other minerals, and
      (2) biologically oxidizing in the second zone under aerobic conditions at least a portion of the nitrogen compounds to nitrates;
   (h) removing water from the third reaction vessel; and
   (i) feeding water from the third reaction vessel to an algae filter comprising a vessel having an inlet and an outlet, a medium disposed in the vessel whereby the medium is capable of supporting algae growth, and an artificial light source whereby the artificial light source is disposed to direct light onto the medium supporting algae growth.

2. The method of claim 1 comprising the further step of separating the precipitated phosphorous and other minerals from the water after at least one of steps (b), (d), or (g).

3. The method of claim 1 comprising the further step of separating the precipitated phosphorous and other minerals from the water after step (h).

4. The method of claim 1 wherein the substantially insoluble basic salt is dolomite.

5. The method of claim 4 wherein the inert substrate is lava rock.

6. The method of claim 1 wherein each of the first reaction vessel, the second reaction vessel, and the third reaction vessel are a plurality of serial zoned vessels.

7. The method of claim 1 wherein the insoluble salt zone and microorganism zone of at least one of the reaction vessels are disposed in separate reaction vessels.

8. The method of claim 1 wherein the artificial light source of the algae filter contains UV light.

9. The method of claim 1 further comprising a plenum disposed in the vessel of the algae filter, the plenum having at least one transparent wall, wherein the medium for supporting algae growth is external to the plenum and the artificial light source is mounted in the plenum.

10. The method of claim 9 wherein the at least one transparent wall of the plenum comprises a thermoplastic poly (methyl methacrylate)-type polymer.

11. The method of claim 10 wherein the medium comprises at least one perforated tray.

12. The method of claim 11 wherein the medium comprises a plurality of perforated trays disposed in a vertically stacked, spaced apart relationship, and where the inlet is disposed at the top of the vessel.

13. The method of claim 12 wherein the inlet of the algae filter has a nozzle for distributing water over the uppermost perforated tray.

14. The method of claim 9 wherein the medium comprises a fixed bed having transparent packing material.

15. The method of claim 14 wherein the transparent packing material comprises cylinders.

16. The method of claim 14 wherein the transparent packing material comprises spheres.

17. The method of claim 9 wherein the medium comprises a fluidized bed.

18. An apparatus for treating nutrient-rich water containing nitrogen compounds, phosphorous compounds, and other minerals comprising:
   (a) at least one first reaction vessel having a first zone containing a substantially insoluble basic salt and a second zone containing aerobic microorganisms retained on an inert substrate, the first vessel having an inlet for feeding the nutrient-rich water to the first zone, and with the first zone and the second zone disposed adjacent to each other and separated by a perforated support sized to retain the insoluble salt while allowing the nutrient-rich water to pass therethrough;

(b) a transfer means for removing water from the first vessel;

(c) at least one second reaction vessel having an inlet for accepting water from the transfer means of (b), the second reaction vessel having a first zone containing a substantially insoluble basic salt and a second zone containing anaerobic microorganisms retained on an inert substrate, the first zone being in fluid communication with the inlet, and with the first zone and the second zone disposed adjacent to each other and separated by a perforated support sized to retain the insoluble salt while allowing water to pass therethrough;

(d) a transfer means for removing water from the second vessel;

(e) at least one third reaction vessel having an inlet for accepting water from the transfer means of (d), the third reaction vessel having a first zone containing a substantially insoluble basic salt and a second zone containing aerobic microorganisms retained on an inert substrate, the first zone being in fluid communication with the inlet, and with the first zone and the second zone disposed adjacent to each other and separated by a perforated support sized to retain the insoluble salt while allowing the water to pass therethrough;

(f) transfer means for removing water from the third vessel;

(g) an aeration device for injecting air into the second zone of the third vessel and a vent disposed at the first zone of the third vessel to remove gas; and (h) an algae filter having an inlet for accepting water from the transfer means of (f), the algae filter comprising a vessel having an inlet and a outlet, a medium disposed in the vessel whereby the medium is capable of supporting algae growth, and an artificial light source whereby the artificial light source is disposed to direct light onto the medium supporting algae growth.

19. The apparatus of claim 18 further comprising at least one separation device disposed for receiving water from at least one of the reaction vessels and for separating precipitates therefrom, wherein the transfer means is disposed for removing water from the separation device.

20. The apparatus of claim 18 wherein the substantially insoluble salt basic salt is dolomite.

21. The apparatus of claim 20 wherein the inert substrate is lava rock.

22. The apparatus of claim 18 wherein each of the first reaction vessel, the second reaction vessel, and the third reaction vessel are a plurality of serial zoned vessels.

23. The apparatus of claim 18 wherein the insoluble salt zone and microorganism zone of at least one of the reaction vessels are disposed in separate reaction vessels.

24. The apparatus of claim 18 wherein the artificial light source of the algae filter contains UV light.

25. The apparatus of claim 18 further comprising a plenum disposed in the vessel of the algae filter, the plenum having at least one transparent wall, wherein the medium for supporting algae growth is external to the plenum and the artificial light source is mounted in the plenum.

26. The apparatus of claim 25 wherein the at least one transparent wall of the plenum comprises a thermoplastic poly (methyl methacrylate)-type polymer.

27. The apparatus of claim 26 wherein the medium comprises at least one perforated tray.

28. The apparatus of claim 2 wherein the medium comprises a plurality of perforated trays disposed in a vertically stacked, spaced apart relationship, and where the inlet is disposed at the top of the vessel.

29. The apparatus of claim 28 wherein the inlet of the algae filter has a nozzle for distributing water over the uppermost perforated tray.

30. The apparatus of claim 25 wherein the medium comprises a fixed bed having transparent packing material.

31. The apparatus of claim 30 wherein the transparent packing material comprises cylinders.

32. The apparatus of claim 30 wherein the transparent packing material comprises spheres.

33. The apparatus of claim 25 wherein the medium comprises a fluidized bed.

* * * * *

UNITED STATES PATENT AND TRADEMARK OFFICE
CERTIFICATE OF CORRECTION

PATENT NO. : 5,670,046
DATED : September 23, 1997
INVENTOR(S) : Ronald C. Kimmel It is certified that error appears in the above-identified patent and that said Letters Patent is hereby corrected as shown below:

At column 4, line 47 replace "Brensted" with --Brønsted--

At column 7, line 27, replace "8.2" with --8.4--.

Signed and Sealed this

Fourteenth Day of April, 1998

Attest:

BRUCE LEHMAN

*Attesting Officer*  *Commissioner of Patents and Trademarks*